United States Patent
Chadha (10) Patent No.: US 7,149,557 B2
(45) Date of Patent: Dec. 12, 2006

(54) MOBILE COMMUNICATION DEVICE HAVING EXTENDABLE DISPLAY

(75) Inventor: Lovleen Chadha, San Diego, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 247 days.

(21) Appl. No.: 10/436,429

(22) Filed: May 12, 2003

(65) Prior Publication Data

US 2004/0229662 A1 Nov. 18, 2004

(51) Int. Cl.
*H04M 1/00* (2006.01)
*H02B 1/00* (2006.01)

(52) U.S. Cl. .................. 455/575.1; 455/566; 455/90.3; 361/600; 361/610; 361/615; 361/681; 361/683

(58) Field of Classification Search ............. 455/575.1, 455/566, 90.3; 361/600, 610, 615, 681, 683; 345/649, 659, 657, 658, 3.1, 169
See application file for complete search history.

(56) References Cited

U.S. PATENT DOCUMENTS

| | | | |
|---|---|---|---|
| 4,385,212 A | 5/1983 | Tyler | |
| 5,262,763 A | 11/1993 | Okuyama et al. | |
| 5,414,444 A | 5/1995 | Britz | |
| 5,485,517 A | 1/1996 | Gray | |
| 5,508,720 A | 4/1996 | DiSanto et al. | |
| 5,579,487 A | 11/1996 | Meyerson et al. | |
| 5,584,054 A | 12/1996 | Tyneski et al. | |
| 5,646,649 A | 7/1997 | Iwata et al. | |
| D389,140 S | 1/1998 | Buhrmann | |
| 5,867,795 A | 2/1999 | Novis et al. | |
| 5,901,222 A | 5/1999 | Macor | |
| 5,901,223 A | 5/1999 | Wicks et al. | |
| D421,983 S | 3/2000 | Wicks et al. | |
| 6,047,196 A | 4/2000 | Mäkelä et al. | |
| 6,085,112 A | 7/2000 | Kleinschmidt et al. | |
| 6,107,997 A | 8/2000 | Ure | |
| 6,118,986 A | 9/2000 | Harris et al. | |
| 6,144,358 A | 11/2000 | Narayanaswamy et al. | |
| 6,233,469 B1 | 5/2001 | Watanabe | |
| 6,259,932 B1 | 7/2001 | Constien | |
| 6,275,714 B1 | 8/2001 | Kintz et al. | |
| 6,297,945 B1 | 10/2001 | Yamamoto | |
| 6,304,763 B1 | 10/2001 | Jahagirdar et al. | |
| 6,311,076 B1 * | 10/2001 | Peuhu et al. ................. | 455/566 |
| 6,327,152 B1 | 12/2001 | Saye | |

(Continued)

FOREIGN PATENT DOCUMENTS

EP 0 539 699 A2 5/1993

(Continued)

*Primary Examiner*—George Eng
*Assistant Examiner*—Huy Phan (57) ABSTRACT

A mobile communication device includes a display assembly that may be extended from the housing of the mobile communication device to provide a larger display surface for displaying information to a user of the mobile communication device. The display assembly is movable between a retracted position wherein the display assembly is retracted within a cavity formed in the housing and an extended position wherein the display assembly is extended from the housing. The display assembly includes a display for displaying information to a user of the mobile communication device. A window is provided in the housing for allowing the user to view at least part of the display when the display assembly is retracted within the cavity. Information displayed by the display is mapped to the display so that the information may be viewed through the window while the display assembly is retracted within the cavity.

20 Claims, 7 Drawing Sheets

U.S. PATENT DOCUMENTS

| | | | |
|---|---|---|---|
| 6,327,482 B1* | 12/2001 | Miyashita | 455/566 |
| 6,332,084 B1 | 12/2001 | Shaanan et al. | |
| 6,396,924 B1 | 5/2002 | Suso et al. | |
| 6,415,138 B1* | 7/2002 | Sirola et al. | 455/90.1 |
| 6,452,626 B1 | 9/2002 | Adair et al. | |
| 6,466,202 B1 | 10/2002 | Suso et al. | |
| 6,483,445 B1 | 11/2002 | England | |
| 6,509,876 B1* | 1/2003 | Jones et al. | 343/702 |
| 6,519,483 B1* | 2/2003 | Watanabe | 455/575.1 |
| 6,535,749 B1 | 3/2003 | Iwata et al. | |
| 6,539,208 B1 | 3/2003 | Mori | |
| 6,542,721 B1 | 4/2003 | Boesen | |
| 6,560,468 B1 | 5/2003 | Boesen | |
| 6,640,113 B1* | 10/2003 | Shim et al. | 455/566 |
| 6,728,557 B1* | 4/2004 | Tracy et al. | 455/575.3 |
| 6,768,899 B1* | 7/2004 | Janninck et al. | 455/566 |
| 6,850,784 B1* | 2/2005 | SanGiovanni | 455/575.1 |
| 6,892,082 B1 | 5/2005 | Boesen | |
| 6,934,518 B1* | 8/2005 | Cheng | 455/90.3 |
| 2001/0018351 A1* | 8/2001 | Hino et al. | 455/552 |
| 2002/0061770 A1* | 5/2002 | Ozaki | 455/566 |
| 2002/0090980 A1* | 7/2002 | Wilcox et al. | 455/566 |
| 2002/0102946 A1* | 8/2002 | SanGiovanni | 455/90 |
| 2002/0160724 A1* | 10/2002 | Arai et al. | 455/90 |
| 2003/0001817 A1* | 1/2003 | Jeon | 345/156 |
| 2003/0050019 A1* | 3/2003 | Dowling et al. | 455/90 |
| 2003/0144034 A1* | 7/2003 | Hack et al. | 455/566 |
| 2003/0153280 A1* | 8/2003 | Kopp et al. | 455/90 |
| 2003/0153363 A1* | 8/2003 | Kuwazoe | 455/566 |
| 2003/0203747 A1* | 10/2003 | Nagamine | 455/575.3 |
| 2004/0052037 A1* | 3/2004 | Sawyer | 361/681 |
| 2004/0137940 A1* | 7/2004 | Matsunami | 455/550.1 |
| 2004/0145536 A1* | 7/2004 | Stephany et al. | 345/3.1 |
| 2004/0198458 A1* | 10/2004 | Kawamura | 455/566 |
| 2004/0203527 A1* | 10/2004 | Matsumoto | 455/90.3 |
| 2004/0203532 A1* | 10/2004 | Mizuta | 455/90.3 |
| 2005/0130720 A1* | 6/2005 | Finke-Anlauff | 455/575.3 |

FOREIGN PATENT DOCUMENTS

| | | |
|---|---|---|
| GB | 2 318 944 | 5/1998 |
| GB | 2 328 343 | 2/1999 |
| GB | 2 337 891 | 12/1999 |
| JP | 9-37015 | 2/1997 |
| JP | 9-247250 | 9/1997 |
| JP | 9-247265 | 9/1997 |
| JP | 9-258705 | 10/1997 |
| JP | 11-249596 | 9/1999 |
| JP | 11-341121 | 12/1999 |
| WO | WO 96/35288 | 11/1996 |

* cited by examiner

MOBILE COMMUNICATION DEVICE HAVING EXTENDABLE DISPLAY

BACKGROUND OF THE INVENTION

The present invention relates generally to mobile communication devices such as mobile telephones, pagers, wireless enabled palmtop computers, personal digital assistants (PDA), or the like, and more particularly, to a mobile communication device having a display assembly that may be extended from the housing of the mobile communication device.

Figure 1:
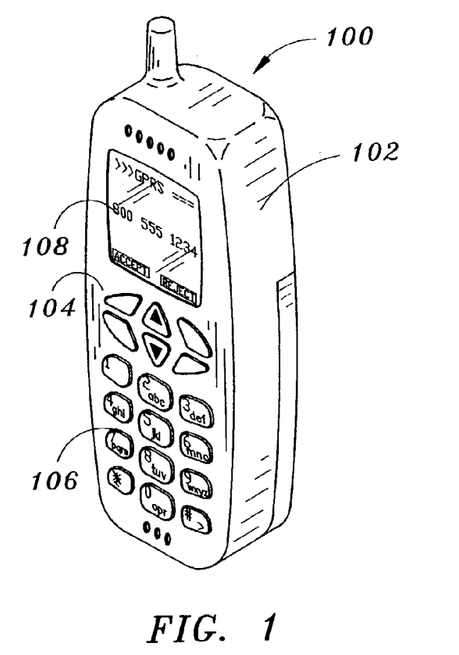
FIG. 1 is an isometric view illustrating a conventional mobile communication device having a fixed display and keypad.

Wireless mobile communication devices, in particular mobile telephones, typically include a keypad and a small display for displaying telephony related features (e.g., telephone numbers, caller identification, telephone functions). A typical mobile communication device, in particular a mobile telephone, is illustrated in FIG. 1. As shown, the mobile communication device 100 includes a housing 102 having a front face 104 that includes a keypad 106 and display 108. Because it is desirable to limit the overall size of the housing 102 of the mobile communication device 100, the area of the front face 104 available to the display 108 is limited. Consequently, the display 108 is typically only capable of displaying limited text or graphics.

Often mobile communication systems provide features or applications beyond simple telephony (e.g., Internet access, text messaging, gaming, and the like). It may be desirable for mobile communication devices employing such communication systems to display greater amounts of text or more complex graphics. As a result, the user, to fully take advantage of the features provided by such mobile communication devices, requires a larger display than is necessary for devices providing only simple telephony features.

One way of providing a larger display area for the mobile communication device is to eliminate the telephone keypad and utilize the entire front face of the mobile communication device as a display, overlaid with a touch sensitive panel or touch screen much like a conventional palmtop computer or personal digital assistant. A keypad may then be displayed by the display when telephony functions are used. However, while such mobile communication devices provide an impressive suite of functions (e.g., address books, calendars, Internet access, and the like) to the user, they are typically more expensive than mobile communication devices employing conventional keypads. Further, such mobile communication devices are somewhat less robust than conventional telephony only devices since the large, open display and touch screen are more susceptible to damage than would be a conventional keypad and smaller display.

Consequently, it is desirable to provide a mobile communication device having a display assembly that may be extended from the housing of the mobile communication device to provide a larger display surface for displaying information to a user of the mobile communication device.

SUMMARY OF THE INVENTION

The present invention is directed to a mobile communication device having an extendable display assembly that may be extended from the housing of the mobile communication device to provide a larger display surface for displaying information to a user of the mobile communication device. The mobile communication device comprises a housing and a display assembly coupled to the housing so that the display assembly is movable between a retracted position, wherein the display assembly is retracted within a cavity formed in the housing, and an extended position wherein the display assembly is extended from the housing. The display assembly includes a display for displaying information to a user of the mobile communication device. In exemplary embodiments, a window disposed in the housing allows the user to view at least part of the display when the display assembly is retracted within the cavity. Displayed information is mapped to the display so that the information may be viewed through the window while the display assembly is retracted within the cavity. Alternatively, a second display may be provided, which may be semi-transparent to allow information provided by the display of the display assembly to be viewed therethrough.

According to one specific embodiment, the display assembly of the mobile communication device pivots about an axis substantially perpendicular to the front face of the housing between a retracted position, wherein the display assembly is retracted within the cavity formed in a side surface of the housing, and an extended position, wherein the display assembly is extended from the side of the housing.

According to a second specific embodiment, the display assembly of the mobile communication device slides between the retracted position and the extended position along a plane substantially parallel with the front face.

According to a third specific embodiment, the display assembly of the mobile communication device pivots about an axis substantially perpendicular to the front face between the retracted position and an intermediate position wherein the display assembly is extended away from the housing. The display assembly then slides between the intermediate position and the extended position along a plane substantially parallel to the front face.

It is to be understood that both the foregoing general description and the following detailed description are exemplary and explanatory only and are not necessarily restrictive of the invention claimed. The accompanying drawings, which are incorporated in and constitute a part of the specification, illustrate embodiments of the invention and together with the general description, serve to explain the principles of the invention.

DETAILED DESCRIPTION OF SPECIFIC EMBODIMENTS

Reference will now be made in detail to the presently preferred embodiments of the invention, examples of which are illustrated in the accompanying drawings.

FIGS. 2 through 17 illustrate an exemplary mobile communication device 200 in accordance with the present invention. The mobile communication device 200 includes a housing 202 having an extendable display assembly 204. The housing 202, which is generally sized to be held in the hand of a user of the mobile communication device 200, includes a front face 206 and a side surface 208 having an elongated cavity 210 formed therein. The display assembly 204 is coupled to the housing 202 so that the display assembly 204 may move between a retracted position, shown in FIGS. 2, 7, 9, 12 and 16, wherein the display assembly 204 is retracted within the cavity 210, and an extended position, shown in FIGS. 3, 8, 10, 15 and 17 wherein the display assembly is extended from the side surface 208 of the housing 202.

The display assembly 204 includes a support or frame 212 coupled to the housing 202, which mounts a display 214 for displaying information to users of the mobile communication device 200. In the exemplary embodiment illustrated, the display 214 comprises a color liquid crystal display (LCD). However, it is contemplated that the display 214 may employ any suitable flat panel display technology, including but are not limited to, monochromatic liquid crystal display (LCD) technologies, plasma display technologies, or polymer light emitting diode (PLED) technologies without departing from the scope and intent of the present invention. Moreover, the display 214 may include a touch sensitive overlay, digitizer, or touch screen to facilitate entry of data by the user via touch or stylus input.

In the embodiments of the mobile communication device 200 illustrated in FIGS. 2 through 15, a window 216 is provided in the front face 206 of the housing 202 to allow the user of the mobile communication device 200 to view a portion of the display 214 while the display assembly 204 is retracted within the cavity 210. Preferably, information displayed by the mobile communication device 200 while the display assembly 204 is in the retracted position is mapped (e.g., via software mapping the logical screen coordinates of the displayed information) to an area 218 of the display 214 that is positioned beneath the window 216 so that a user of the mobile communication device 200 may view the information through the window 216 without extending the display assembly 204.

Figure 2:
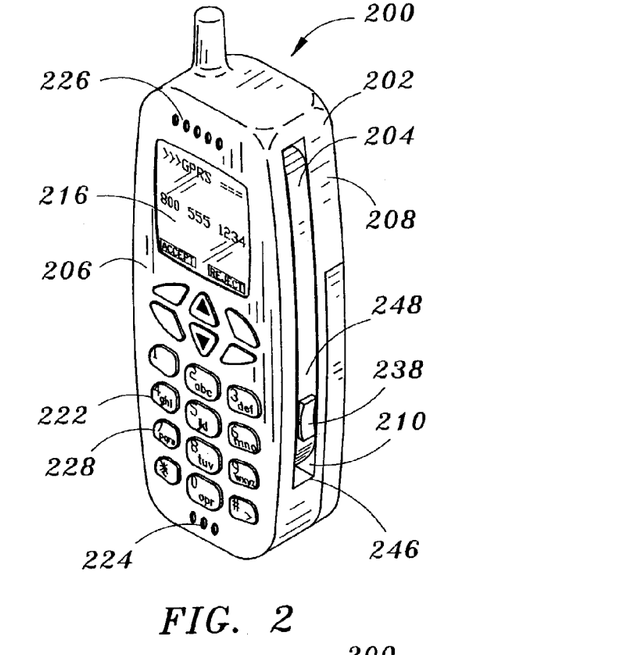
FIG. 2 is an isometric view illustrating a mobile communication device having an extendable display assembly in accordance with an exemplary embodiment of the present invention.
Figure 3:
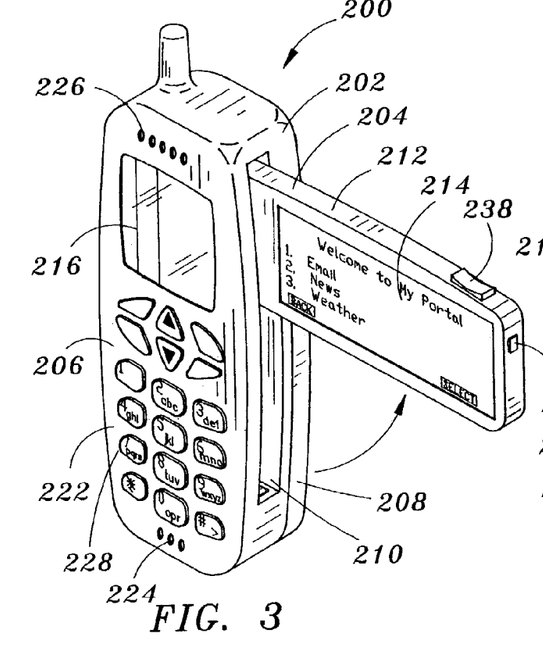
FIG. 3 is an isometric view of the mobile communication device shown in FIG. 2, wherein the extendable display assembly is shown in the extended position.
Figure 6:
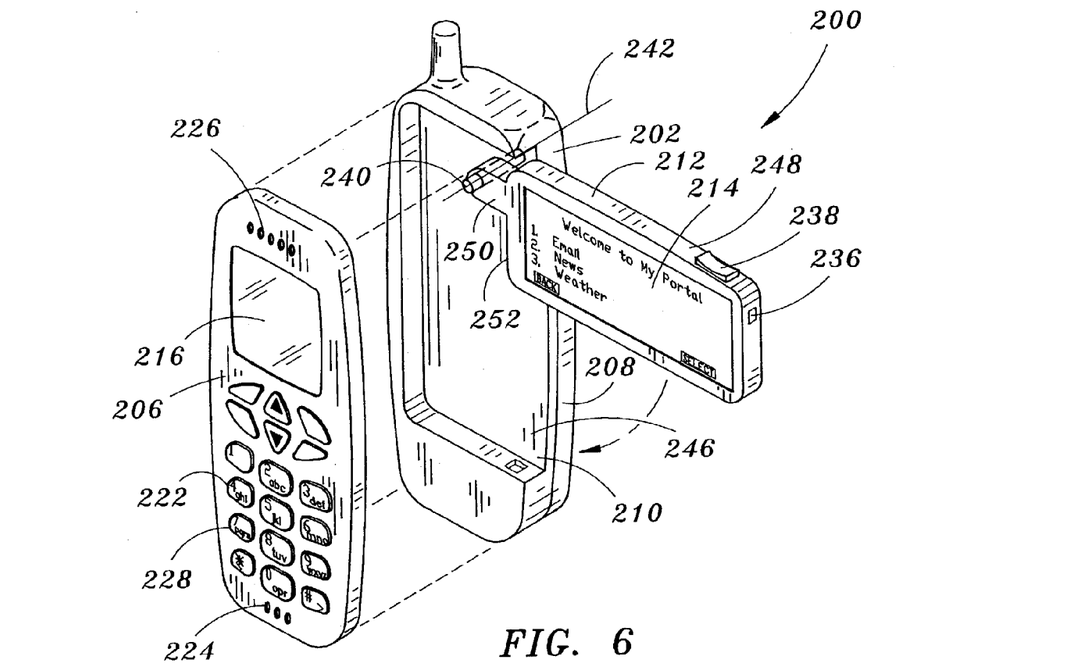
Figures 7, 8:
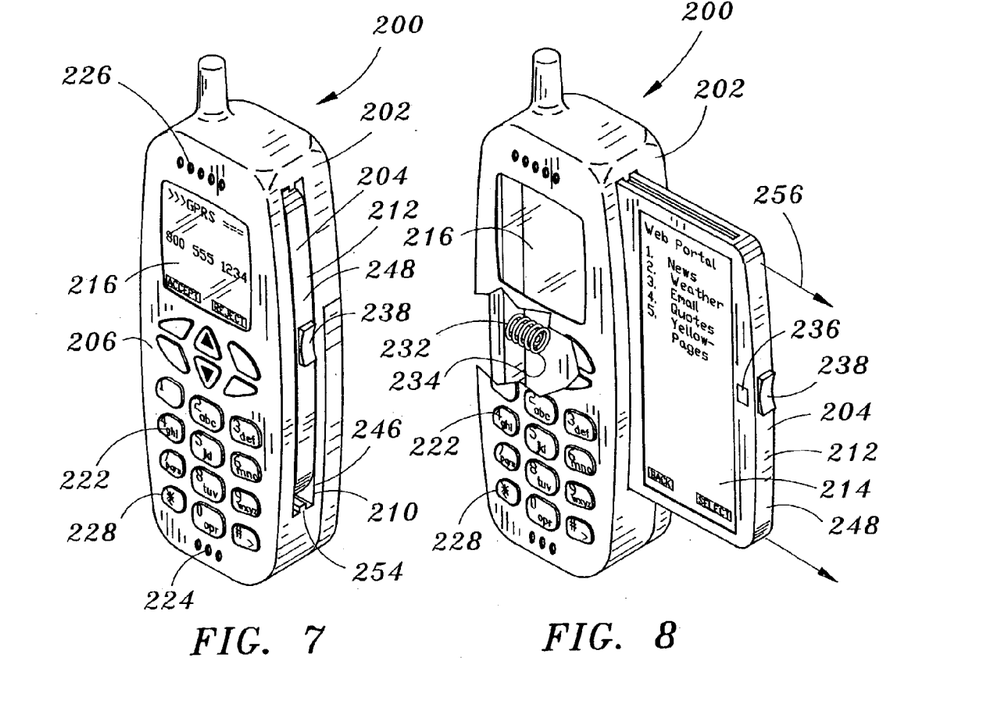
FIG. 7 is an isometric view illustrating a mobile communication device having an extendable display assembly in accordance with a second exemplary embodiment of the present invention.
FIG. 8 is an isometric view of the mobile communication device shown in FIG. 7, wherein the extendable display assembly is shown in the extended position.
Figures 9, 10:
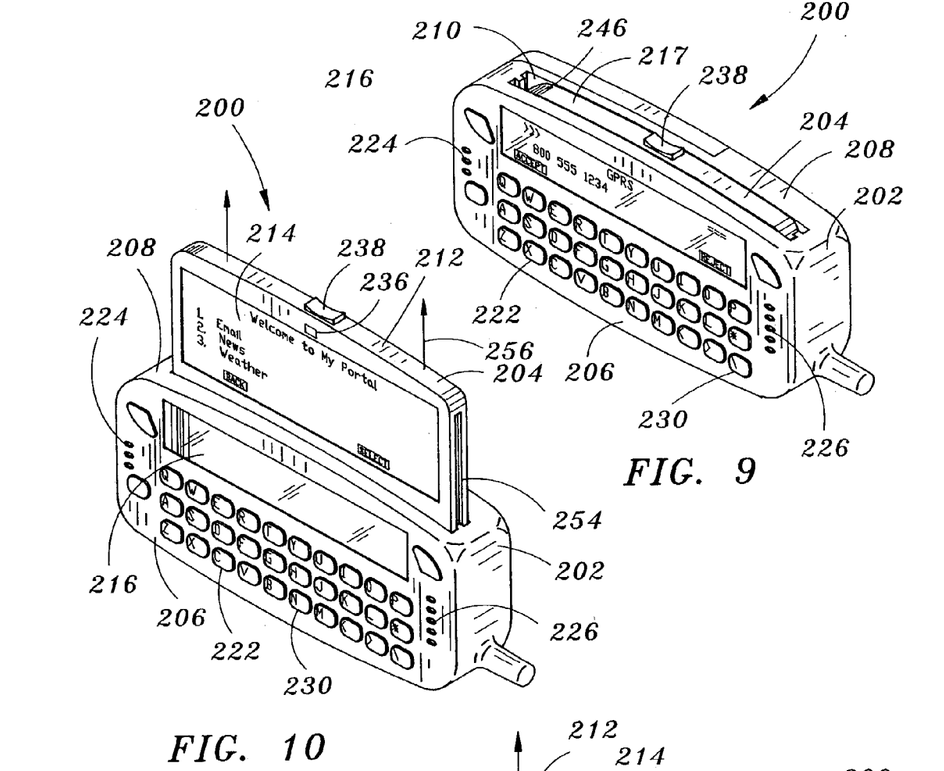
FIG. 9 is an isometric view illustrating a mobile communication device having an extendable display assembly in accordance with a third exemplary embodiment of the present invention.
FIG. 10 is an isometric view of the mobile communication device shown in FIG. 9, wherein the extendable display assembly is shown in the extended position.
Figure 11:
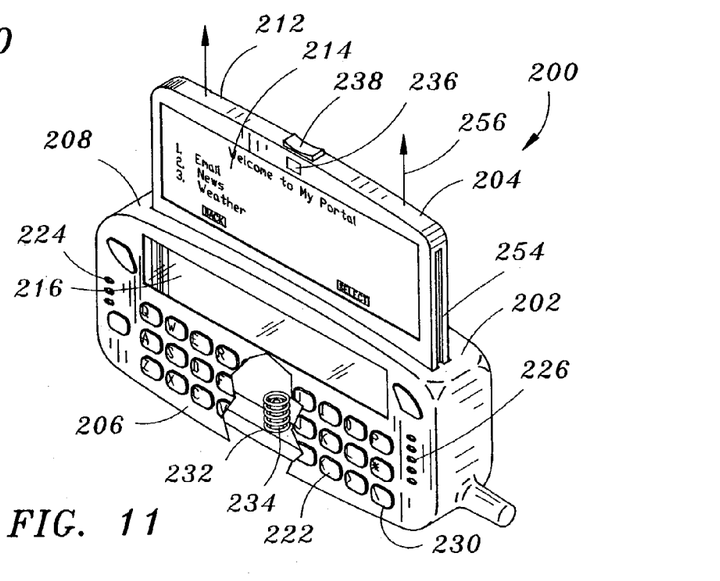
FIG. 11 is a partial isometric view of the mobile communication device shown in FIG. 9, further illustrating an exemplary extension mechanism.
Figures 14, 15:
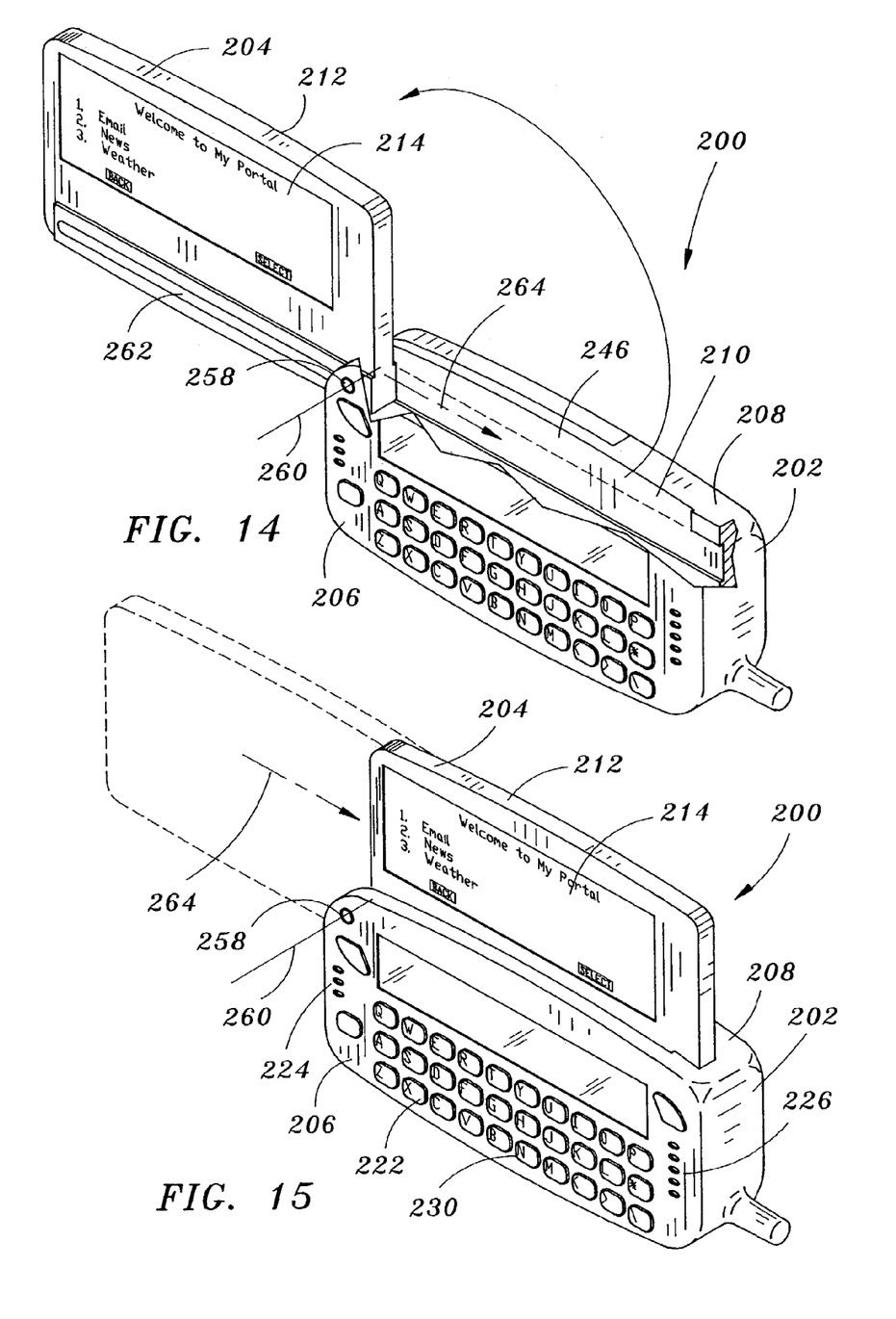

It will be appreciated that the area 218 of the display 220 viewable through the window 220 is limited by the area of the window 220, which is in turn limited by the area of the front face 206 of the housing 202. For example, the mobile communication devices 200 shown in FIGS. 2 through 8 employ a vertically oriented window 216 showing only a portion of the area of the display 24. In a specific example, the window 216 shows approximately thirty to forty percent (30–40%) of the area of the display 214. Thus, when the display assembly 204 is in the retracted position, approximately the upper thirty to forty percent (30–40%) of the display 214 is visible through the window 216 for the display of information. Likewise, the mobile communication devices 200 shown in FIGS. 9 through 15 employ a horizontally oriented window 216 showing only a portion of the area of the display (e.g., window 216 having an area of approximately ten to twenty percent (10–20%) of the area of the display 214 so that approximately ten to twenty percent (10–20%) of the display 214 is visible) when the display assembly 204 is in the retracted position. When the display assembly 204 is in the extended position, as shown in FIGS. 3, 8 and 15, displayed information is mapped to the full display 214 (i.e., the information may be displayed using all or any part of the display 214). Additionally, as shown in FIGS. 2 and 3, the orientation of the information displayed by the display 214 may be changed so that the information is displayed in a horizontal orientation with respect to the housing 202.

In exemplary embodiments, the window 216 may only allow a portion of the display 214 to be viewed while the display assembly 204 is in the retracted position. Consequently, it is contemplated it may be desirable to limit that amount and/or type of information 224 displayed by the display 214 while the display assembly 204 is in the retracted position. For example, the mobile communication device 200 may display only features requiring easy access by the user, such as information related to telephony functions of the mobile communication device 200, while the display assembly 204 is in the retracted position. Where access to more complex information such as Email, Internet browsing functions, gaming functions, calendar functions, or the like, is desired, the user may move the display assembly 204 to the extended position so that the entire display may be used to display the information.

Figure 16:
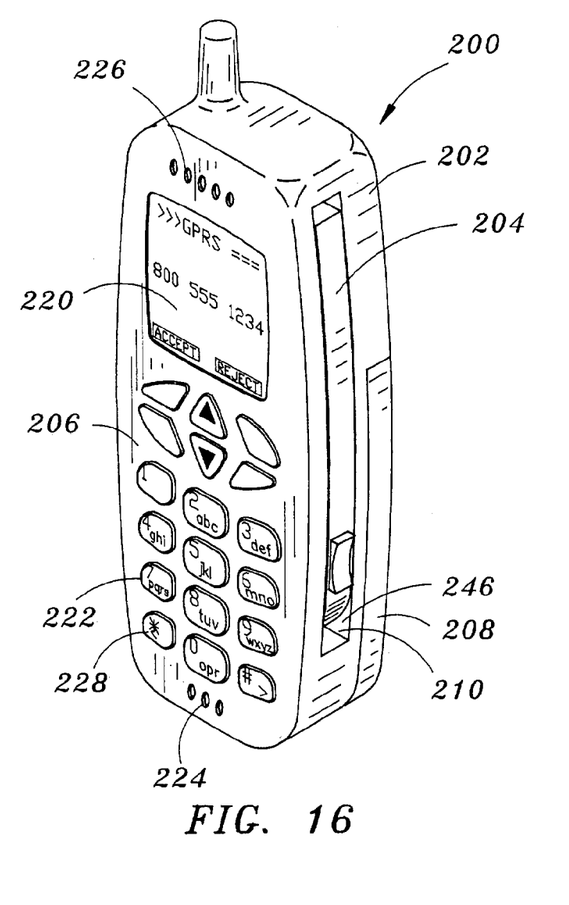
FIG. 16 is an isometric view illustrating a mobile communication device having a first, extendable display assembly and a second, fixed display in accordance with an exemplary embodiment of the present invention.
Figure 17:
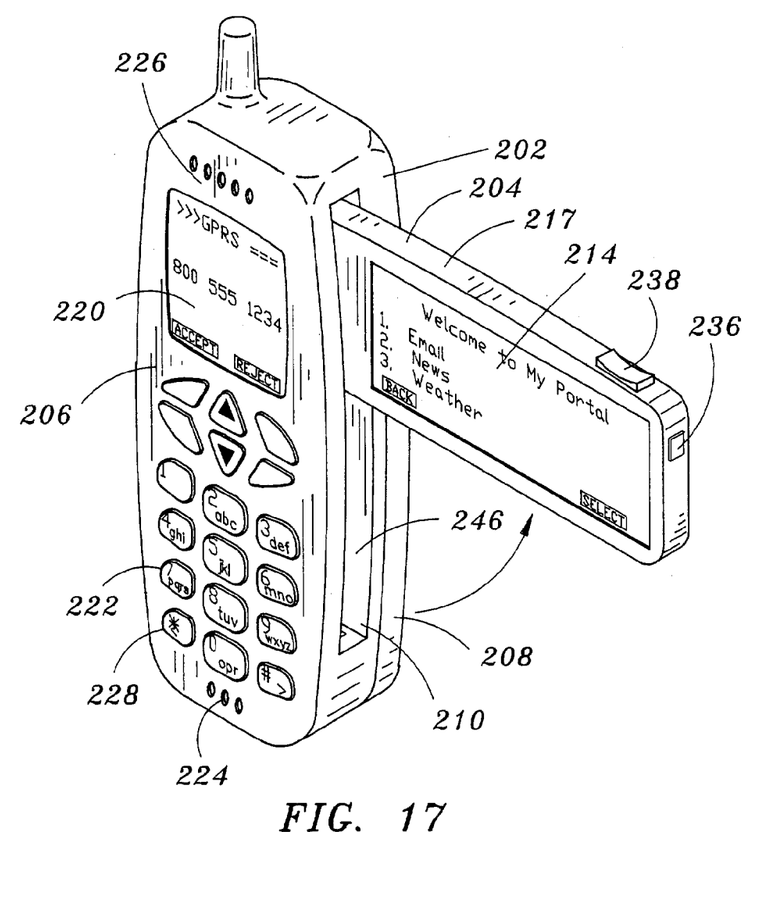
FIG. 17 is an isometric view of the mobile communication device shown in FIG. 16, wherein the extendable display assembly is shown in the extended position.

Alternatively, as shown in FIGS. 16 and 17, the mobile communication device 200 may include a second display 220 provided on the front face 206 of the housing 202 instead of the window 216. The second display 220 is employed for displaying information while the display assembly 204 is in the retracted position (shown in FIG. 16). When in the retracted position, the display assembly 204 may be shut off to conserve power when second display 220 is used. Alternatively, the second display 220 may be semi-transparent so that the display 214 of the display assembly 204 may be viewed through the second display 220 while the display assembly 204 is in the retracted position. In this manner, information provided by the second display 220 may be overlaid onto information provided by the display 214 of the display assembly 204. When the display assembly 204 is in the extended position, as shown in FIG. 17, information may be displayed by display 214 of the display assembly 204 alone with the second display 220 being shut off. Alternatively, information may be displayed by both the display 214 of the display assembly 204 and the second display 220. The displays 214 and 220 may display textual and graphical information contiguously.

In the embodiments illustrated, the mobile communication device 200 includes a keypad assembly 222 disposed in the front face 206 of the housing 202 adjacent to the window 216 (or second display 220), a microphone assembly 224 provided in the front face 206 of the housing 202 adjacent to and below the keypad assembly 222, and a speaker 226 positioned in the front face 206 of the housing adjacent to and above the window 216 (or second display 220). It is contemplated that the layout of keys of the keypad assembly 222 may be varied depending on design requirements of the particular mobile communication device 200. For example, in the vertically oriented mobile communication devices 200 of the embodiments illustrated in FIGS. 1 through 8, 16 and 17, the keypad assembly 222 comprises a conventional telephone keypad layout having function keys 228, while in the horizontally oriented mobile communication devices 200 of the embodiments illustrated in FIGS. 9 through 15, the keypad assembly comprises a QWERTY keyboard layout 230. Other key layouts are also possible.

The mobile communication device 200, which in a preferred embodiment comprises a mobile telephone, may further include components for providing wireless communication of voice and/or data information with external sources such as a base station, a cellular communication system tower, a second mobile communication device, or the like. For example, the mobile communication device 200 may comprise a processing assembly, memory, a transmitter/receiver assembly or transceiver, an antenna, a data card reader for receiving a data card (e.g., a subscriber identification module (SIM) card or a user identification module (UIM) card), a power source such as a battery, and the like. Additionally, it is contemplated that the mobile communication device 200 may provide functions other than telephony. For example, the mobile communication device 200 may provide functions common to hand held computers or personal digital assistants. In such embodiments, the mobile communication device may further include a suitable processing system, extended memory, a touch screen overlaying display 214 for tactile input of data, or the like.

The mobile communication device 200 may further include an extension mechanism 232 for extending the display assembly 204 from the retracted position. In exemplary embodiments, the extension mechanism 232 comprises a spring assembly 234 positioned within the cavity 210 which provides a biasing force that tends to move the display assembly 204 away from the fully retracted position to a partially extended position. The user of the mobile communication device 200 may then grasp the frame assembly 212 and manually move the display assembly 204 to the fully extended position. Alternatively, the extension mechanism 232 may comprise a drive mechanism that moves the display assembly 204 from the fully retracted position to the fully extended position without assistance from the user. A latching mechanism 236 may be provided for holding the display assembly 204 in the retracted position to prevent the display assembly 204 from being inadvertently extended. In exemplary embodiments, the latching mechanism 236 may include a button or slide 238, which, when actuated by the user of the mobile communication device 204, releases the display assembly 204, allowing the display assembly 204 to be extended by the extension mechanism 232. The latching mechanism may include a catch or pin, which may be beveled to ease engagement of the catch during retraction of the display assembly 204. Alternatively, where the extension mechanism 232 comprises a drive mechanism, the latching mechanism may be actuated electrically (e.g., via a solenoid, or the like).

FIGS. 1 through 6, 16 and 17 illustrate embodiments of the mobile communication device 200 wherein the display assembly 204 is pivoted or rotated between the retracted and extended positions much like a conventional folding knife (e.g., a pocket knife or switchblade knife). In these embodiments, the display assembly 204 is coupled to the housing 202 via a pin assembly 240 located within the cavity 210. The pin assembly 240 allows the display assembly 204 to pivot or rotate about an axis 242, coaxial with the pin assembly 240, which is substantially perpendicular to the front face 206 of the housing 202. The pin assembly 240 may further provide electrical connection between the display 214 and the processing system of the mobile communication device 200 for provision of electrical power to the display assembly 204 and transmission of display information to the display 214. In this manner, the display assembly 204 may pivot or rotate between the retracted position, shown in FIGS. 2 and 16, and the extended position, shown in FIG. 3 and 17.

Figure 4:
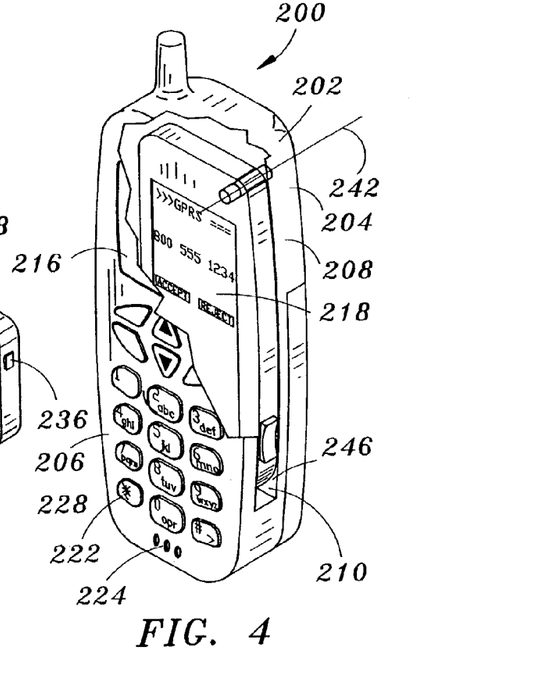
FIG. 4 is a partial isometric view of the mobile communication device shown in FIG. 2, further illustrating mapping of information to the display of the extendable display assembly.
Figure 5:
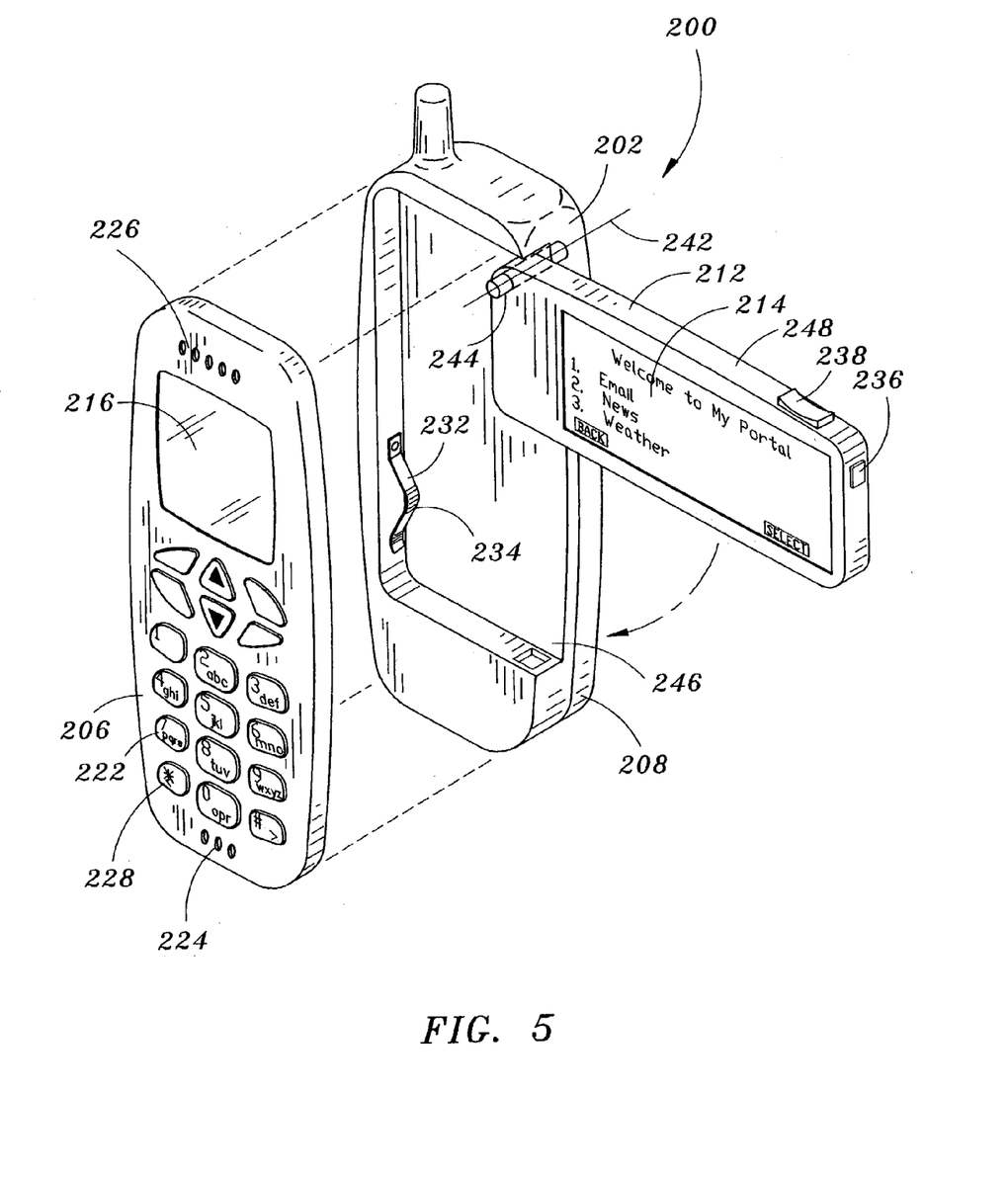
FIGS. 5 and 6 are exploded isometric views of the mobile communication device shown in FIG. 2, further illustrating the pin assembly coupling of the extendable display assembly to the housing.

In such embodiments, the mobile communication device 200 may be configured to maximize the viewable area of the display 214 when the display assembly 204 is in the extended position. For example, as shown in FIGS. 4 and 5, the point where the pin assembly 240 connects to the display assembly 204 to the housing 202 may be located so that the axis of rotation 242 of the display assembly 204 is proximate to a corner 244 of the display assembly frame 212 that is adjacent to the opening 246 to the cavity 210. In this manner, the diameter of the arc through which the display assembly 204 rotates as the display assembly 204 pivots between the retracted position and the extended position is maximized for the volume available within the cavity 210. As a result, the display assembly 204 may accommodate a larger display 214 than would otherwise be possible. Additionally, by placing the pin assembly 216 at the corner 244 of the display assembly 204, the outer edge 248 of the display frame 212 may be sized to substantially fill the opening 246 to the cavity 210 while the display assembly 204 is in the retracted position. In this manner, the display frame assembly 212 may function to prevent contaminants such as moisture, dirt, debris, or the like from entering the cavity 210. Alternatively, the axis of rotation 242 may be moved further into the cavity 210. For example, as shown in FIG. 6, the display frame assembly 212 may include a lever arm portion 250 connecting display frame assembly 212 with the pin assembly 240 so that the axis of rotation 218 of the display assembly 204 is positioned along an edge 252 of the display frame assembly 212. Preferably, the lever arm portion 250 is sized to allow the entire display 214 to be visible to the user of the mobile communication device 200 when the display assembly 204 is rotated to the extended position, as shown in FIG. 4, while allowing the display 214 to be positioned under the window 216 (or semi-transparent display 220) while the display assembly 204 is in the retracted position.

FIGS. 7 though 11 illustrate embodiments of the mobile communication device 200 wherein the display assembly 204 slides between the retracted and extended positions. In these embodiments, the display assembly 204 is coupled to the housing 202 via a rail or track assembly 254 that extends along the edges of the display assembly frame 212. The track assembly 254 allows the display assembly 204 to slide between the retracted position, shown in FIGS. 7 and 9, and the extended position, shown in FIGS. 8, 10 and 11, along a plane, indicated by arrowed lines 256, that is substantially parallel with the front face 206 of the housing 202. In the embodiment shown in FIGS. 7 and 8, the window 216 (or alternatively a second display) and keypad assembly 222 are oriented vertically on the front face 206 of the housing 202. The display assembly 204 extends from a side of the housing 202. Alternatively, in the embodiment shown in FIGS. 9 through 11, the window 216 (or second display) and keypad assembly 222 are oriented horizontally on the front face 206 of the housing 202. The display assembly 204 thus extends from the top (or, alternatively the bottom) of the housing 202.

Figure 12:
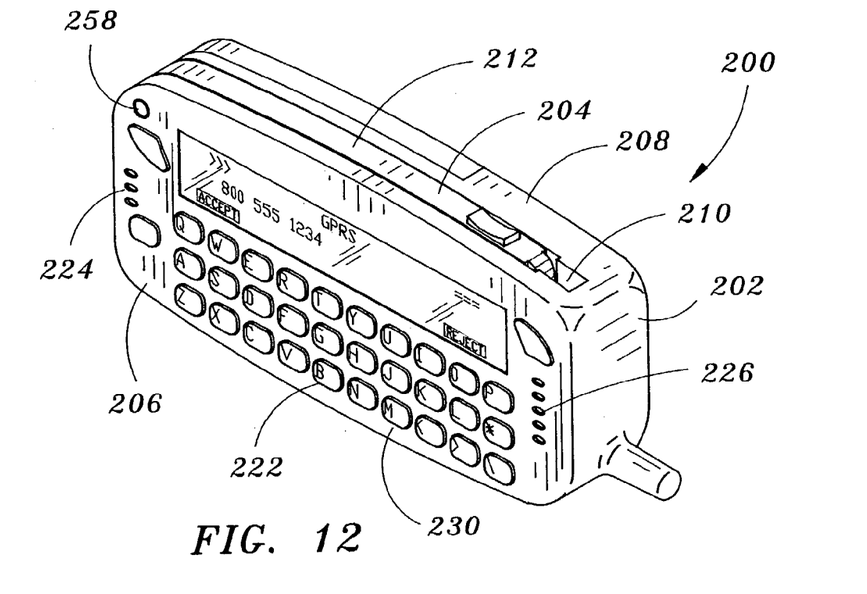
FIG. 12 is an isometric view illustrating a mobile communication device having an extendable display assembly in accordance with a fourth exemplary embodiment of the present invention.
Figure 13:
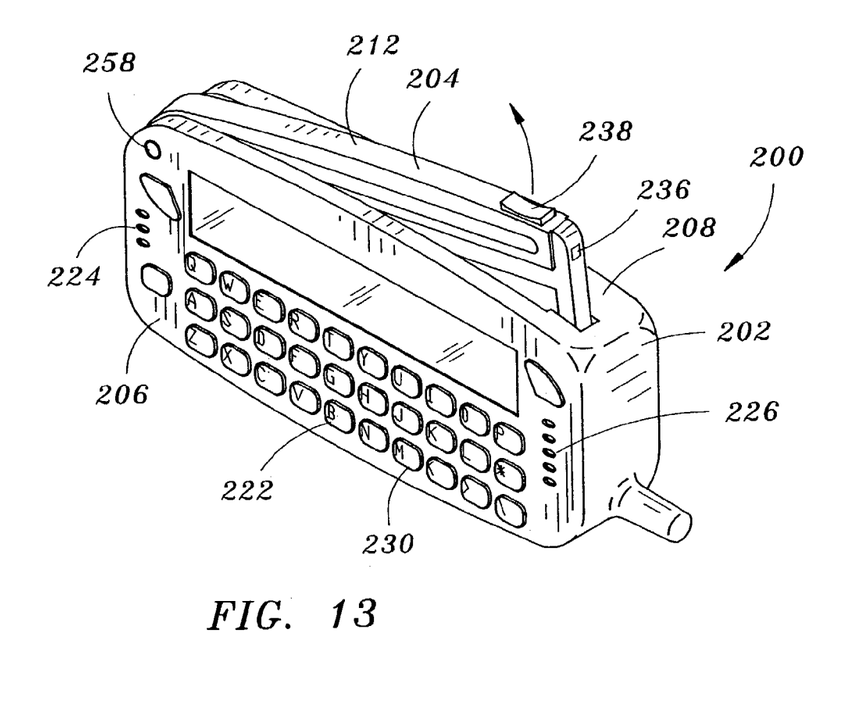
FIGS. 13, 14 and 15 are isometric views of the mobile communication device shown in FIG. 12, illustrating extension and retraction of the extendable display assembly.

FIGS. 12 though 15 illustrate an embodiment of the mobile communication device 200 wherein the display assembly 204 pivots or rotates between the retracted position and an intermediate position, and then slides between the intermediate position and the extended position. In this embodiment, the display assembly 204 is coupled to the housing 202 via a pin assembly 258, which may provide electrical connection between the display 214 and components such as the processing system and power supply of the mobile communication device 200. To extend the display assembly 204, the pin assembly 258 allows the display assembly 204 to pivot or rotate about an axis 260, coaxial with the pin assembly 258, which is substantially perpendicular to the front face 206 of the housing 202. In this manner, the display assembly 204 may pivot or rotate from the retracted position, shown in FIG. 12, to the intermediate position, shown in FIG. 14, wherein the display assembly 14 is extended away from the housing 202 but is not aligned with the keypad 222. The pin assembly 258 may then move along track 260 so that the display assembly 204 may slide to the extended position, shown in FIG. 15, along a plane, indicated by arrowed line 264, which is substantially parallel to the front face 206 of the housing 202. In this manner, the display 214 is substantially aligned with the keypad assembly 222 while the display assembly 204 is in the extended position. The edge of the display assembly 204 may interface with a track in the housing 202 to keep the display assembly 204 oriented substantially parallel to the housing 202 while the display assembly 204 is in the extended position. Preferably, as the display assembly 204 is moved to the extended position, software or firmware automatically changes the orientation of information displayed by the display 214 so that the information is displayed in an upright orientation relative to the keypad 222. For example, in one embodiment, software or firmware may remap the logical coordinates of the information so that the orientation of the information is flipped vertically on the display 214. To retract the display assembly 204, the display assembly 204 is slid from the extended position, shown in FIG. 15, to the intermediate position, shown in FIG. 14, and then pivoted or rotated back to the retracted position, shown in FIG. 12.

In the embodiment shown in FIGS. 12 through 15, the window 216 (or alternatively a second display) and keypad assembly 222 are oriented horizontally on the front face 206 of the housing 202. The display assembly 204 thus extends from the top (or, alternatively the bottom) of the housing 202. However, it will be appreciated that display assemblies 204 in accordance with this embodiment (i.e., display assemblies 204 which pivot and slide between the retracted and extended positions) may also be implemented in mobile communication devices 200 wherein the window 216 (or alternatively the second display) and keypad assembly 222 are oriented vertically.

In FIGS. 2 through 17, the display assembly 204 is illustrated as extending either to the right side of the housing 202 of the mobile communication device 200 (FIGS. 2 though 10, 16 and 17), or to the top of the housing 202 of the mobile communication device 200 (FIGS. 11 through 15). However, it is contemplated that, in other embodiments, the display assembly 204 may alternatively extend to the left side of the housing 202, or, may alternately extend to either side of the housing 202 depending, for example, on whether the user was right or left handed without departing from the scope and intent of the present invention.

For purposes of illustration, the embodiments of the mobile communication device 200 illustrated in FIGS. 2 through 17 are exemplary, and are thus shown in "brick" form with ornate features eliminated. However, those of ordinary skill in the art will recognize that mobile communication devices 200 in accordance with the present invention are not limited to the specific configurations disclosed herein, but instead may employ form factors having other ornamental or functional design features without departing from the scope and intent of the present invention, It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A mobile communication device, comprising:
   a housing having a cavity formed therein, the housing comprising a front face and a side surface;
   a display assembly coupled to the housing so that the display assembly is movable between a retracted position wherein the display assembly is at least substantially retracted within the cavity and an extended position wherein the display assembly is extended front the housing, the display assembly including a display for displaying information to a user of the mobile communication device and a frame for mounting the display so that the display is framed by the frame; and
   a window disposed in the housing for allowing the user to view at least part of the display when the display assembly is retracted within the cavity, the window being disposed in the front face of the housing and the cavity being formed in the side surface of the housing;
   wherein the displayed information is mapped to the display so that the information is viewable through the window while the display assembly is retracted within the cavity, the display assembly pivots about an axis substantially perpendicular to the front face between the retracted position and an intermediate position extended away from the housing, and slides between the intermediate position and the extended position along the side surface in a plane substantially parallel to the front face.

2. The mobile communication device as claimed in claim 1, wherein the cavity comprises an opening and the axis is proximate to a corner of the display assembly adjacent to the opening.

3. The mobile communication device as claimed in claim 1, wherein the window comprises a second display, the second display being semi-transparent so that information displayed by the display is viewable there through.

4. The mobile communication device as claimed in claim 1, further comprising a latching mechanism for latching the display assembly in the retracted position.

5. The mobile communication device as claimed in claim 1, further comprising an extension mechanism for extending the display assembly from the refracted position.

6. The mobile communication device as claimed in claim 1, wherein the displayed information is mapped to an area of the display within the window while the display assembly is in the retracted position, and wherein the displayed information is mapped to the full display while the display assembly is in the extended position.

7. The mobile communication device as claimed in claim 1, further comprising a keypad disposed in the housing adjacent to the window.

8. A mobile communication device, comprising:
a housing having a front face and a side surface, the side surface having a cavity formed therein;
a display assembly coupled to the housing so that the display assembly pivots about an axis substantially perpendicular to the front face between a retracted position wherein the display assembly is retracted within the cavity and an extended position wherein the display assembly is extended from the housing, the display assembly including a display for displaying information to a user of the mobile communication device and a frame for mounting the display so that the display is framed by the frame; and
a window disposed in the front face for allowing the user to view at least part of the display when the display assembly is retracted within the cavity, the window comprises a second display, second display being semi-transparent so that information displayed by the display is viewable there through,
wherein the displayed information is mapped to the display so that the information is viewable through the window while the display assembly is retracted within the cavity, the display assembly pivots about an axis substantially perpendicular to the front face between the retracted position and an intermediate position extended away from the housing, and slides between the intermediate position and the extended position along the side surface in a plane substantially parallel to the front face.

9. The mobile communication device as claimed in claim 8, wherein the cavity comprises an opening and the axis is proximate to a corner of the display assembly adjacent to the opening.

10. The mobile communication device as claimed in claim 8, further comprising a latching mechanism for latching the display assembly in the retracted position.

11. The mobile communication device as claimed in claim 8, further comprising an extension mechanism for extending the display assembly from the retracted position.

12. The mobile communication device as claimed in claim 8, wherein the displayed information is mapped to an area of the display within the window while the display assembly is in the retracted position, and wherein the displayed information is mapped to the full display while the display assembly is in the extended position.

13. The mobile communication device as claimed in claim 8, further comprising a keypad disposed in the front face adjacent to the window.

14. A mobile communication device, comprising:
a housing having a front face and a side surface, the side surface having a cavity formed therein;
a display assembly coupled to the housing so that the display assembly is movable between a retracted position wherein the display assembly is retracted within the cavity and an extended position wherein the display assembly is extended from the housing, the display assembly including a frame mounting a display for displaying information to a user of the mobile communication device; and
a window disposed in the front face for allowing the user to view at least part of the display when the display assembly is retracted within the cavity,
wherein the display assembly pivots about an axis substantially perpendicular to the front face between the retracted position and an intermediate position and slides between the intermediate position and the extended position along the side surface in a plane substantially parallel to the front face.

15. The mobile communication device as claimed in claim 14, wherein the cavity comprises an opening and the axis is proximate to a corner of the display assembly adjacent to the opening.

16. The mobile communication device as claimed in claim 14, wherein the window comprises a second display, the second display being semi-transparent so that information displayed by the display is viewable there through.

17. The mobile communication device as claimed in claim 14, further comprising a latching mechanism for latching die display assembly in the retracted position.

18. The mobile communication device as claimed in claim 14, further comprising an extension mechanism for extending the display assembly from the refracted position.

19. The mobile communication device as claimed in claim 14, wherein the displayed information is mapped to an area of the display within the window while the display assembly is in the retracted position and wherein the displayed information is mapped to the full display while the display assembly is in the extended position.

20. The mobile communication device as claimed in claim 14, further comprising a keypad disposed in the front face adjacent to the window.

* * * * *